(12) United States Patent
Cho et al.

(10) Patent No.: US 12,586,779 B2
(45) Date of Patent: Mar. 24, 2026

(54) COMPOSITE ANODE ACTIVE MATERIAL AND ANODE AND LITHIUM SECONDARY BATTERY INCLUDING THE SAME

(71) Applicant: SAMSUNG SDI CO., LTD., Yongin-si (KR)

(72) Inventors: Yungu Cho, Yongin-si (KR); Doori Oh, Yongin-si (KR); Heeyoung Chu, Yongin-si (KR); Hyun Soh, Yongin-si (KR); Yoonyoung Choi, Yongin-si (KR); Yubin Hwang, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 652 days.

(21) Appl. No.: 16/925,579

(22) Filed: Jul. 10, 2020

(65) Prior Publication Data

US 2021/0013493 A1 Jan. 14, 2021

(30) Foreign Application Priority Data

Jul. 10, 2019 (KR) ........................ 10-2019-0083431

(51) Int. Cl.
| | |
|---|---|
| *H01M 4/38* | (2006.01) |
| *H01M 4/133* | (2010.01) |
| *H01M 4/134* | (2010.01) |
| *H01M 4/36* | (2006.01) |
| *H01M 10/0525* | (2010.01) |
| *H01M 4/02* | (2006.01) |

(52) U.S. Cl.
CPC ........... *H01M 4/366* (2013.01); *H01M 4/133* (2013.01); *H01M 4/134* (2013.01); *H01M*

*4/386* (2013.01); *H01M 10/0525* (2013.01); *H01M 2004/027* (2013.01); *H01M 2220/20* (2013.01)

(58) Field of Classification Search
CPC ...... H01M 4/366; H01M 4/133; H01M 4/134; H01M 4/386; H01M 10/0525; H01M 2004/027; H01M 2220/20; H01M 4/364; H01M 4/587; H01M 4/625; H01M 4/483; H01M 10/052; Y02E 60/10
See application file for complete search history.

(56) References Cited

U.S. PATENT DOCUMENTS

| | | | |
|---|---|---|---|
| 9,806,329 | B2 | 10/2017 | Choi et al. |
| 10,622,624 | B2 | 4/2020 | Son et al. |

(Continued)

FOREIGN PATENT DOCUMENTS

| | | |
|---|---|---|
| KR | 10-1211327 B1 | 12/2012 |
| KR | 10-2014-0025335 A | 3/2014 |

(Continued)

OTHER PUBLICATIONS

Korean Office action dated Sep. 11, 2024.

*Primary Examiner* — Cynthia K Walls
(74) *Attorney, Agent, or Firm* — Lee IP Law, P.C.

(57) ABSTRACT

A composite anode active material, an anode, and a lithium secondary battery, the composite anode active material including a silicon-carbon composite; a first graphite; and a second graphite that is different from the first graphite, wherein the first graphite has an average particle diameter $D_{50}$ of about 10 μm or greater, and the second graphite has an average particle diameter $D_{50}$ of about 18 μm or greater.

11 Claims, 19 Drawing Sheets

(56)                 References Cited

U.S. PATENT DOCUMENTS

| | | | |
|---|---|---|---|
| 2006/0263690 A1* | 11/2006 | Suhara | H01M 4/525 |
| | | | 429/231.6 |
| 2008/0193850 A1* | 8/2008 | Ellis | H01M 4/68 |
| | | | 429/234 |
| 2009/0104519 A1* | 4/2009 | Kim | H01M 4/587 |
| | | | 429/163 |
| 2013/0273433 A1 | 10/2013 | Louanneau-Si et al. | |
| 2016/0181599 A1* | 6/2016 | Hwang | H01M 4/525 |
| | | | 429/231.95 |
| 2016/0233501 A1* | 8/2016 | Lee | H01M 4/587 |
| 2016/0268591 A1* | 9/2016 | Choi | H01M 4/1395 |
| 2018/0083272 A1* | 3/2018 | Son | H01M 4/625 |
| 2018/0145316 A1 | 5/2018 | Moon et al. | |
| 2021/0202931 A1 | 7/2021 | Lee et al. | |

FOREIGN PATENT DOCUMENTS

| | | |
|---|---|---|
| KR | 10-2015-0063620 A | 6/2015 |
| KR | 10-1612603 B1 | 4/2016 |
| KR | 10-2016-0109946 A | 9/2016 |
| KR | 10-2018-0031585 A | 3/2018 |
| KR | 10-2018-0056395 A | 5/2018 |
| KR | 10-2019-0047195 A | 5/2019 |

* cited by examiner

COMPOSITE ANODE ACTIVE MATERIAL AND ANODE AND LITHIUM SECONDARY BATTERY INCLUDING THE SAME

CROSS-REFERENCE TO RELATED APPLICATION

Korean Patent Application No. 10-2019-0083431, filed on Jul. 10, 2019, in the Korean Intellectual Property Office, and entitled: "Composite Anode Active Material and Anode and Lithium Secondary Battery Including the Same," is incorporated by reference herein in its entirety.

BACKGROUND

1. Field

Embodiments relate to a composite anode active material, an anode including the same, and a lithium secondary battery including the anode.

2. Description of Related Art

Lithium batteries are used as power sources for portable electronic devices such as video cameras, mobile phones, and laptop computers. A rechargeable lithium secondary battery may be capable of high-rate charging and may have an energy density per unit weight that is at least three times as large as that of a conventional lead storage battery.

A lithium secondary battery generates electricity through oxidation/reduction reactions of lithium ions which are intercalated/deintercalated in a cathode and an anode in a state where an organic electrolytic solution or a polymer electrolytic solution fills a region between the cathode and the anode, each including an active material enabling intercalation and deintercalation of lithium ions.

Recently, there has been a considerable demand for high-energy density batteries suitable for use in large-sized electronic devices such as electric automobiles requiring high energy density.

SUMMARY

The embodiments may be realized by providing a composite anode active material including a silicon-carbon composite; a first graphite; and a second graphite, wherein the first graphite has an average particle diameter $D_{50}$ of about 10 μm or greater, and the second graphite has an average particle diameter $D_{50}$ of about 18 μm or greater.

The silicon-carbon composite may have a structure in which silicon particles are coated with a carbon compound.

The silicon-carbon composite may be a porous silicon composite cluster including a porous core including a porous silicon composite secondary particle and a shell including a second graphene on the core.

The porous silicon composite secondary particle may include an aggregate of two or more silicon composite primary particles, and the silicon composite primary particles are porous silicon composite clusters each including silicon; $SiO_x$, in which $0<x<2$, on the silicon; and a first graphene on the silicon oxide.

The silicon-carbon composite may include a porous silicon composite cluster including a porous silicon composite secondary particle and second carbon flakes on at least one surface of the porous silicon composite secondary particle; and a carbon coating film including amorphous carbon on the porous silicon composite cluster.

The porous silicon composite secondary particle may include an aggregate of two or more silicon composite primary particles, and the silicon composite primary particles may be porous silicon composite cluster structures, each including silicon; $SiO_{x'}$, in which $0<x'<2$, on at least one surface of the silicon; and first carbon flakes on at least one surface of the silicon oxide.

The silicon-carbon composite may have an average particle diameter $D_{50}$ of about 12 μm or less.

The first graphite may have a crystal interplanar spacing $d_{002}$ in a range of 3.359 Å to 3.360 Å, and the second graphite may have a crystal interplanar spacing $d_{002}$ in a range of 3.356 Å to 3.357 Å.

The first graphite may have an average particle diameter $D_{50}$ in a range of about 10 μm to about 22 μm.

The second graphite may have an average particle diameter $D_{50}$ in a range of about 18 μm to about 44 μm.

Each of the first graphite and the second graphite may have a small particle fraction of 60% or less.

The first graphite may have a pellet density in a range of about 1.69 to about 1.73 g/cc, and the second graphite may have a pellet density in a range of about 2.0 to about 2.13 g/cc.

The composite anode active material may have a zinc blende structure and satisfying the following Formula 1:

$$0.225 \leq r_C/r_A \leq 0.414 \qquad \text{<Formula 1>}$$

wherein, in Formula 1, $r_C$ is an average particle diameter $D_{50}$ of the silicon-carbon composite, and $r_A$ is an average particle diameter $D_{50}$ of each of the first graphite and the second graphite.

The first graphite may be artificial graphite, and the second graphite may be natural graphite.

The composite anode active material may further include flake graphite, wherein an average particle diameter $D_{50}$ of the flake graphite is smaller than or equal to that of the silicon-carbon composite, the average particle diameter $D_{50}$ of the silicon-carbon composite is smaller than or equal to that of the first graphite, and the average particle diameter $D_{50}$ of the first graphite is smaller than or equal to that of the second graphite, The flake graphite may be included in an amount of about 5% by weight or less, based on a total weight of the composite anode active material.

A weight ratio of the silicon-carbon composite to a mixed graphite including the first graphite and the second graphite may be about 95:5 to about 80:20.

The embodiments may be realized by providing an anode including the composite anode active material according to an embodiment.

The anode may have an area disorder of 0.6 or less, as evaluated by a distribution diagram based on Delaunay triangulation.

The embodiments may be realized by providing a lithium secondary battery including a cathode; the anode according to an embodiment; and an electrolyte.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
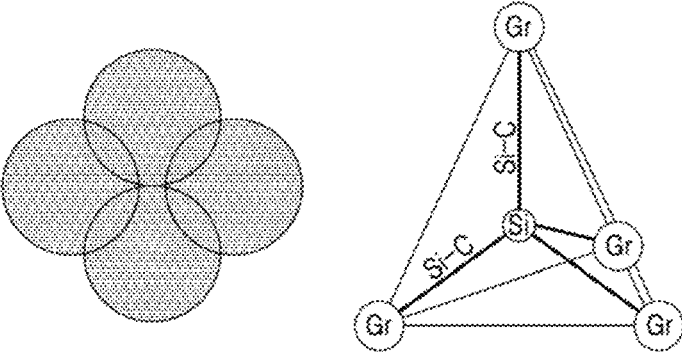
FIG. 1 is a diagram illustrating a zinc blende structured composite anode active material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the terms "or" and "and/or" include any and all combinations of one or more of the associated listed items. Throughout the disclosure, the expression "at least one of a, b or c" indicates only a, only b, only c, both a and b, both a and c, both b and c, all of a, b, and c, or variations thereof.

Hereinafter, particular embodiments will be illustrated in the drawings and described in detail in the detailed description. However, this is not intended to limit the embodiments to particular modes of practice, and it is to be appreciated that all changes, equivalents, and substitutes that do not depart from the spirit and technical scope are encompassed in the embodiments.

The terms used herein are merely used to describe particular embodiments, and are not intended to limit the embodiments. An expression used in the singular encompasses the expression of the plural, unless it has a clearly different meaning in the context. As used herein, it is to be understood that the terms such as "includes," "have," and "comprise" are intended to indicate the presence of the features, numbers, steps, actions, components, parts, ingredients, materials, or combinations thereof disclosed in the specification, but do not preclude the possibility that one or more other features, numbers, steps, actions, components, parts, ingredients, materials, or combinations thereof may exist or may be added. The symbol "/" used herein may be interpreted as "and" or "or" according to the context.

As described herein, when a portion "includes" an element, another element may be further included, rather than excluding the existence of the other element, unless otherwise described.

In the drawings, the diameters, lengths, and thicknesses of layers and regions may be exaggerated or reduced for clarity. Throughout the specification, like reference numerals refer to like elements. Throughout the specification, it is to be understood that when a component, such as a layer, a film, a region, or a plate, is referred to as being "on" another component, the component can be directly on the other component or intervening components may be present thereon. It will be understood that when an element is referred to as being "on" another element, it can be directly on the other element or intervening elements may be present therebetween. In contrast, when an element is referred to as being "directly on" another element, there are no intervening elements present. In contrast, when an element is referred to as being "directly on" another element, there are no intervening elements present. Throughout the specification, It will be understood that when A and B are referred to as being disposed to "directly contact" each other, the surface of A and the surface of B are brought into contact with each other, and there is no intervening element present at the interface between A and B. Throughout the specification, the terms "first," "second," etc. may be used to describe various elements, these elements, components, regions, layers and/or sections should not be limited by these terms. These terms are only used to distinguish one element from another element. Some of components may not be shown in the drawings for the better understanding of features of the embodiments but are not intended to omit the components.

As used herein, the term "composite" does not refer to a state where a plurality of components having different properties are merely mixed and physically contacted, but, instead, refers to a state where components have a set or certain bonding relationship through mechanochemical, electrochemical, and/or chemical reactions that cannot be reached by a simple mixing process. For example, the term "composite anode active material" refers to an anode active material as a resulting product obtained through a mechanochemical, electrochemical, and/or chemical reactions.

Hereinafter, composite anode active materials according to example embodiments, anodes including the composite anode active materials, and lithium secondary batteries including the anodes will be described in further detail.

According to an embodiment, provided is a composite anode active material including, e.g., a silicon-carbon composite; a first graphite; and a second graphite. The first graphite may be different from the second graphite. The first graphite may have, e.g., an average particle diameter $D_{50}$ of about 10 μm or greater, and the second graphite may have, e.g., an average particle diameter $D_{50}$ of about 18 μm or greater.

In some high-capacity silicon-carbon composite materials employed as an anode active material, a reduced Si particle size and degradation of conductivity may occur. In this regard, in the present disclosure, the dispersion of silicon particles may be strengthened by employing large-particle graphite, which may be achieved by controlling the average particle diameter of graphite, e.g., the average particle diameters of first graphite and second graphite of the composite anode active material. In addition, the strengthened silicon dispersion may help achieve low volume expansion and formation of a uniform conduction pathway in an anode plate including the silicon-carbon composite, thereby obtaining superior lifespan characteristics without a sudden drop at early cycles when charging and discharging cycles are repeated.

In addition, as described above, the dispersion of Si particles may also be reinforced by improving the composite anode active material itself. In an implementation, a dispersion reinforcing process using a general dispersant or varying a mixing method, or the addition of a separate dispersing process following a mixing step, may not be required. Accordingly, the possibility of any issues that may be caused by manufacturing characteristics of an electrode plate, may be overcome, and the manufacturing process may be simplified.

In an implementation, the silicon-carbon composite may have a structure in which silicon particles are coated with a carbon compound (e.g., a carbon-based compound).

A carbon compound layer on each of the silicon particles may help reduce or prevent disintegration or pulverization of particles, which could otherwise occur to some silicon particles. The carbon compound layer may serve as a clamping layer that helps reduce or prevent disintegration of the silicon particles. The effect of the carbon compound layer serving as a clamping layer that helps reduce or prevent disintegration of silicon particles may be observed by examining whether the carbon compound layer still serves as the clamping layer even after repeated cycles of lithiation and delithiation.

When the silicon particles swell, carbon compound layers may slide over each other, and then slide back to their relaxed positions during the delithiation. For example, the van der Walls force may be greater than a frictional force between the carbon compound layers.

In an implementation, the silicon-carbon composite may have a graphite-free structure in which graphite is not present in an inner region of the structure surrounded by silicon particles, e.g., a core part of the composite.

In a silicon-carbon composite having a graphite-free core part structure, the resistance of the composite itself may be increased, resulting in degradation of conductivity. In this regard, the present disclosure introduced a composite anode capable of exhibiting superior battery efficiency while increasing the conductivity by including a conducting agent having a predetermined shape.

In an implementation, the silicon-carbon composite may be a porous silicon composite nanocluster including a porous core including a porous silicon composite secondary particle and a shell including a second graphene on the core.

In an implementation, the porous silicon composite secondary particle may include an aggregate of two or more silicon composite primary particles. The silicon composite primary particles may be porous silicon composite nanoclusters each including, e.g., silicon; silicon oxide ($SiO_x$, in which $0<x<2$) on the silicon; and a first graphene on the silicon oxide.

In an implementation, the silicon-carbon composite may include, e.g., a porous silicon composite nanocluster including a porous silicon composite secondary particle and a second carbon flake on at least one surface of the porous silicon composite secondary particle; and a carbon coating film that includes amorphous carbon on the porous silicon composite nanocluster.

In an implementation, the porous silicon composite secondary particle may include an aggregate of two or more silicon composite primary particles.

In an implementation, the silicon composite primary particles may be porous silicon composite nanocluster structures, each including silicon; silicon oxide ($SiO_x$) ($0<x<2$) on at least one surface of the silicon; and a first carbon flake on at least one surface of the silicon oxide. In an implementation, the silicon oxide may exist in the form of a film, a matrix, or a combination thereof.

Each of the first carbon flake and the second carbon flake may exist in the form of a film, a particle, a matrix, or a combination thereof. In an implementation, each of the first carbon flake and the second carbon flake may be, e.g., graphene, graphite, carbon fiber, or graphene oxide.

In an implementation, the porous silicon composite secondary particle may have an average particle diameter $D_{50}$ of about 200 nm to about 50 μm, e.g., about 1 μm to about 30 μm, about 1 μm to about 10 μm, or about 3 μm to about 8 μm. In an implementation, the porous silicon composite secondary particles may have a specific surface area of about 0.1 $m^2/g$ to about 100 $m^2/g$, e.g., about 1 $m^2/g$ to about 30 $m^2/g$, or about 1 $m^2/g$ to about 10 $m^2/g$. In an implementation, the porous silicon composite secondary particle may have a true density of about 0.1 g/cc to about 2.8 g/cc, e.g., about 0.1 g/cc to about 2.0 g/cc, about 0.5 g/cc to about 1.5 g/cc, or about 0.9 g/cc to about 1.5 g/cc. In an implementation, the porous silicon composite secondary particle may have a compression density of about 0.1 g/cc to about 2.0 g/cc, e.g., about 0.1 g/cc to about 1.5 g/cc, about 0.1 g/cc to about 1.3 g/cc, or about 0.5 g/cc to about 1.3 g/cc.

In an implementation, the silicon-carbon composite may have an average particle diameter $D_{50}$ of, e.g., about 12 μm or less. In an implementation, the silicon-carbon composite may have an average particle diameter $D_{50}$ of, e.g., about 11 μm or less. In an implementation, the silicon-carbon composite may have an average particle diameter $D_{50}$ in a range of, e.g., about 5 to about 12 μm.

The silicon-carbon composite may have the average particle diameter range stated above, may have a relatively small size, may help suppress a side reaction between the composite and the electrolytic solution, and may provide improved lifespan characteristics. As the size of the silicon-carbon composite decreases, the composite may be advantageously used. If the composite were to have an extremely small average particle diameter, e.g., less than 5 μm, the overall packing density of the composite anode active material could be reduced, lowering the battery capabilities.

In an implementation, the first graphite may have a crystal interplanar spacing $d_{002}$ in a range of, e.g., 3.359 Å to 3.360 Å, and the second graphite may have a crystal interplanar spacing $d_{002}$ in a range of, e.g., 3.356 Å to 3.357 Å.

Accordingly, it may be seen that the composite anode active material of the present disclosure may have first graphite and second graphite mixed therein.

In an implementation, the average particle diameter $D_{50}$ of the first graphite may be in a range of, e.g., about 10 μm to about 22 μm. In an implementation, the average particle diameter $D_{50}$ of the first graphite may be in a range of, e.g., about 15 μm to about 22 μm. In an implementation, the average particle diameter $D_{50}$ of the first graphite may be in a range of, e.g., about 17 μm to about 22 μm. In an implementation, the average particle diameter $D_{50}$ of the first graphite may be in a range of, e.g., about 19 μm to about 20 μm.

In an implementation, the average particle diameter $D_{50}$ of the second graphite may be in a range of, e.g., about 18

μm to about 44 In an implementation, the average particle diameter $D_{50}$ of the second graphite may be in a range of, e.g., about 21 μm to about 44 In an implementation, the average particle diameter $D_{50}$ of the second graphite may be in a range of, e.g., about 21 μm to about 34 μm. In an implementation, the average particle diameter $D_{50}$ of the second graphite may be in a range of, e.g., about 21 μm to about 26 μm.

Maintaining the average particle diameter $D_{50}$ of the first graphite or the second graphite within the range stated above, e.g., when the average particle diameter $D_{50}$ of the first graphite is 10 μm or greater or when the average particle diameter $D_{50}$ of the second graphite 18 μm or greater, the desired effects of the present disclosure may be achieved, and the overall tap density of the composite anode active material may be maintained. In addition, maintaining the average particle diameter $D_{50}$ of the first graphite at 22 μm or less or the average particle diameter $D_{50}$ of the second graphite at 44 μm or less may help ensure that the overall packing density of the composite anode active material is not lowered. In an implementation, the number of first or second graphite particles used in an anode plate may be maintained, beneficially affecting uniform dispersion or binding capacity.

In an implementation, the first graphite may be artificial graphite and the second graphite may be natural graphite.

In an implementation, each of the first graphite and the second graphite may have a small particle fraction of 60% or less. In an implementation, at least one of the first graphite and the second graphite may have a small particle fraction of 40% or less. In an implementation, the small particle fraction of the first graphite may be 20% or less. In an implementation, each of the first graphite and the second graphite may a small particle fraction of 40% or less.

As used herein, the term "small particle fraction" means a proportion of small particles relative to total particles when a median value of particle diameters of the first graphite (artificial graphite) and second graphite (natural graphite) is obtained, and a particle having a particle diameter not greater than the median value is defined as a small particle, and a particle having a particle diameter greater than the median value is defined as a large particle.

In an implementation, the first graphite may have a pellet density in a range of, e.g., about 1.50 g/cc to about 1.76 g/cc, about 1.63 g/cc to about 1.73 g/cc, or about 1.69 g/cc to about 1.73 g/cc. 1 g of the graphite was added to a circular mold having a diameter of 1 centimeter (cm), and then a pressure of 1,000 kgf/cm2 was applied thereto to obtain a pellet. The pellet density, i.e., the mass per volume, of the graphite was measured.

In an implementation, the second graphite may have a pellet density in a range of, e.g., about 1.65 g/cc to about 2.40 g/cc, about 1.75 g/cc to about 2.2 g/cc, or about 2.0 to about 2.13 g/cc.

Both of the first graphite and the second graphite may satisfy the properties stated above, and the anode active material may exhibit superior conductivity while minimizing degradation of battery efficiency. Therefore, degradation of conductivity and long lifespan characteristic, which could otherwise arise when the silicon content is increased in the conventional silicon-carbon composite, may be reduced or prevented.

In an implementation, the natural graphite may have a spherical shape. The natural graphite having higher conductivity than artificial graphite may have a spherical shape, and the anode active material employing the spherical natural graphite may be less affected by the specific surface area of the natural graphite, while increasing the conductivity.

In an implementation, the composite anode active material may have a zinc blende structure (wurtzite structure) and may satisfy the following Formula 1.

$$0.225 \leq r_C/r_A \leq 0.414 \qquad \text{<Formula 1>}$$

In Formula 1, $r_C$ is an average particle diameter $D_{50}$ of the silicon-carbon composite, and $r_A$ is an average particle diameter $D_{50}$ of the first graphite and the second graphite.

FIG. 1 is a diagram illustrating a zinc blende structured composite anode active material according to an embodiment.

Referring to FIG. 1, it may be seen that the (Si—C) silicon-carbon composite, the first graphite (Gr), and the second graphite (Gr) in the composite anode active material have a zinc blende structure. In an implementation, the composite anode active material may have a crystal structure in which a structure of four Gr particles linked to the Si—C composite at the center in a tetrahedral manner, and a structure of four Si—C composites linked to the Gr particle at the center in a tetrahedral manner, overlap.

In an implementation, as represented by Formula 1, the $r_C/r_A$ may be in a range of, e.g., 0.225 to 0.414. In an implementation, given the average particle diameter $D_{50}$ of each of the first graphite and the second graphite, the $r_C/r_A$ may be closer to 0.414. In an implementation, the average particle diameter $D_{50}$ of each of first graphite and second graphite may be larger than that of the silicon-carbon composite, by which the dispersion of silicon particles may be strengthened, as described above. The strengthened silicon dispersion may achieve low volume expansion and uniform conduction pathway formation in the anode plate including the silicon-carbon composite. Accordingly, superior lifespan characteristics may be obtained without a sudden deterioration at early cycles when charging and discharging cycles are repeated.

Figure 2A:
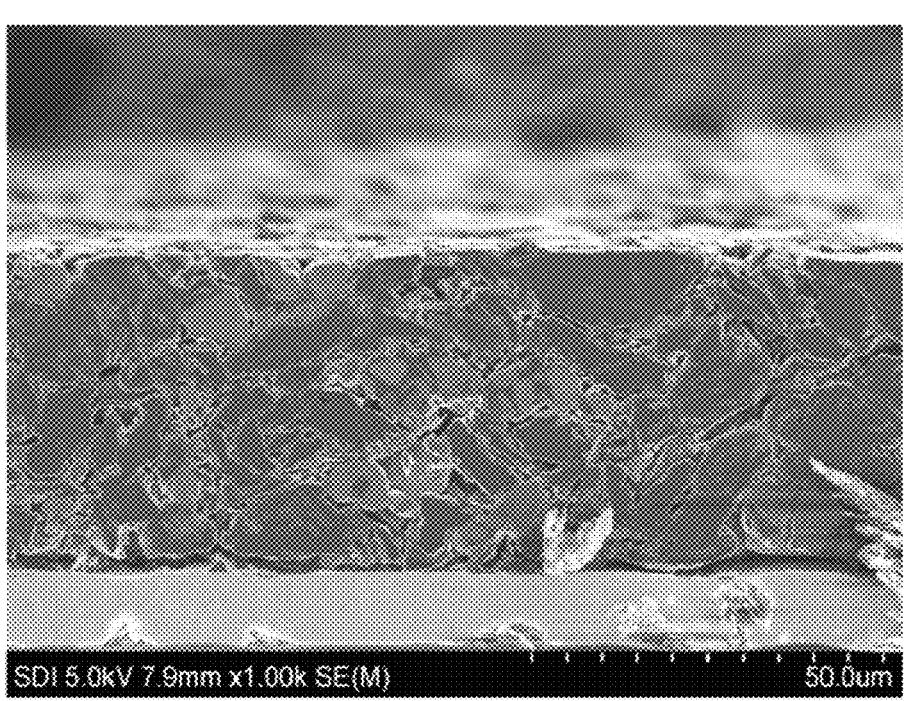
FIG. 2A is a scanning electron microscope (SEM) image illustrating a cross-section of an anode plate comprising a composite anode active material according to an embodiment.
Figure 2B:
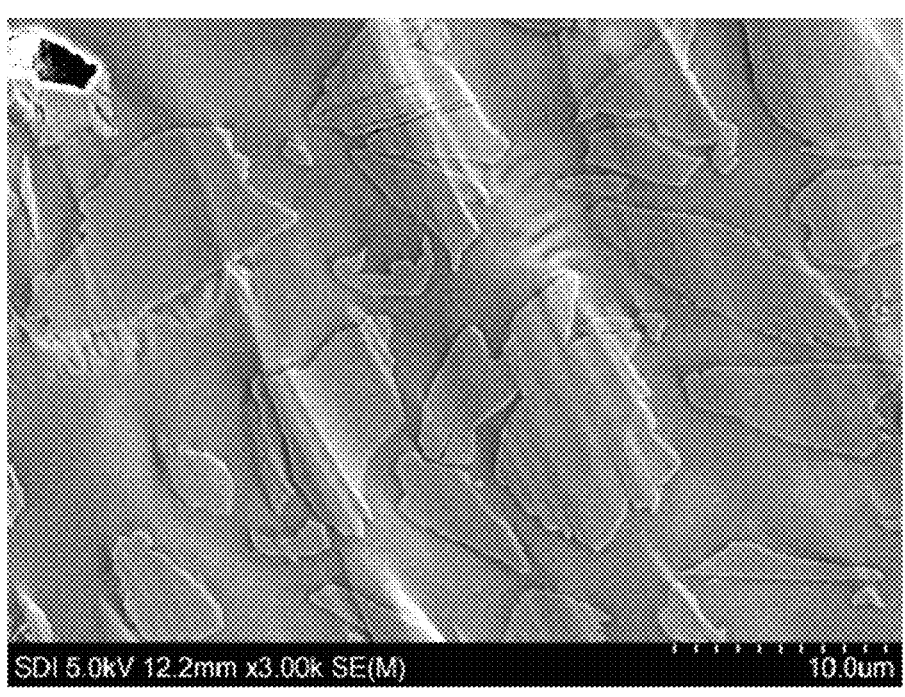
FIG. 2B is an SEM image illustrating a cross-section of artificial graphite.
Figure 2C:
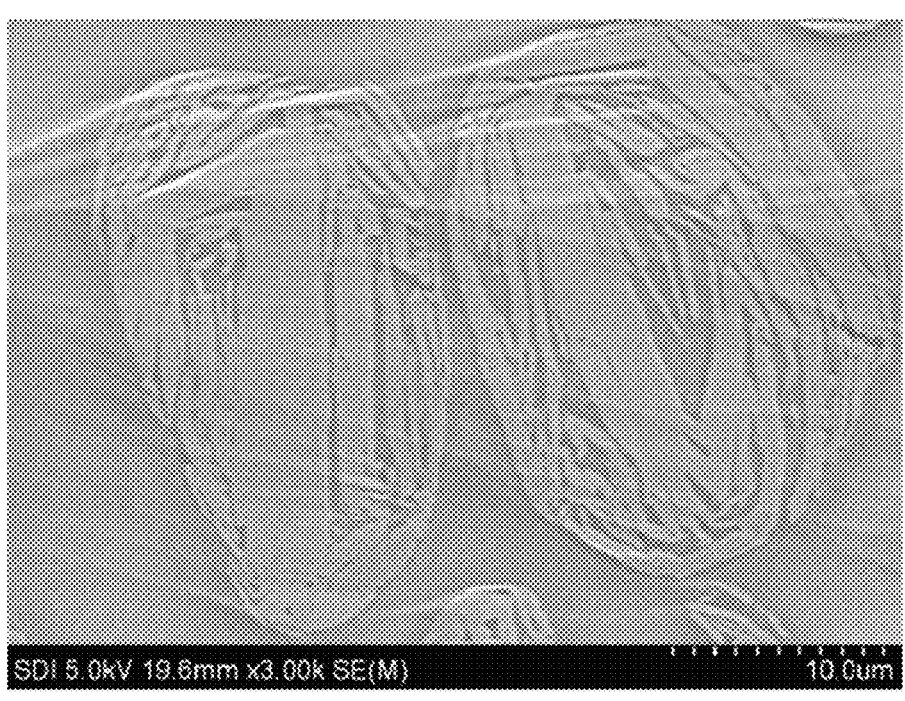
FIG. 2C is an SEM image illustrating a cross-section of natural graphite.
Figure 2D:
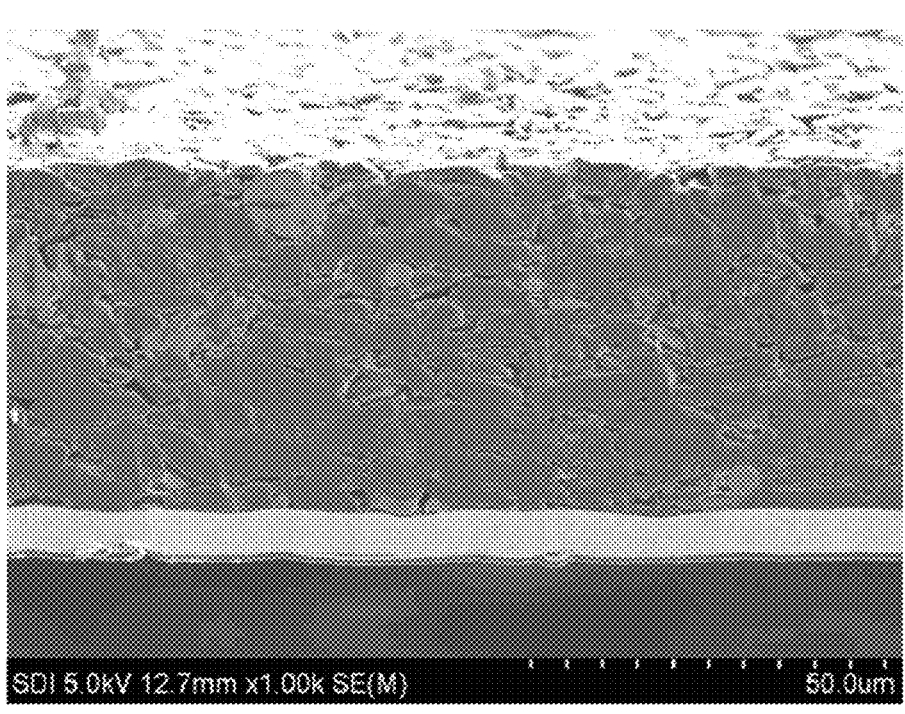
FIG. 2D is an SEM image illustrating a cross-section of an anode plate including artificial graphite and a silicon-carbon composite alone.

FIG. 2A is a scanning electron microscope (SEM) image illustrating a cross-section of an anode plate comprising a composite anode active material according to an embodiment, FIG. 2B is an SEM image illustrating a cross-section of artificial graphite, FIG. 2C is an SEM image illustrating a cross-section of natural graphite, and FIG. 2D is an SEM image illustrating a cross-section of an anode plate including only artificial graphite and a silicon-carbon composite.

Referring to FIGS. 2B and 2C together, it may be seen that natural graphite has many internal pores while artificial graphite has little internal pores.

From the SEM image of FIG. 2A with reference to FIGS. 2B and 2C, it may be seen that the composite anode active material according to an embodiment includes both of artificial graphite without internal pores and natural graphite with internal pores. It may be seen that the composite anode active material according to an embodiment includes artificial graphite and natural graphite mixed therein.

It may be seen from the SEM image of FIG. 2D that a composite anode active material according to an embodiment includes only artificial graphite without natural graphite.

In an implementation, the composite anode active material may further include flake graphite. The flake graphite may serve as a conducting agent. The flake graphite used as a conducting agent may provide improved electrical conductivity and lifespan characteristic.

In an implementation, the average particle diameter $D_{50}$ of the flake graphite may be smaller than or equal to that of the silicon-carbon composite, the average particle diameter $D_{50}$ of the silicon-carbon composite may be smaller than or equal to that of the first graphite, and the average particle diameter $D_{50}$ of the first graphite may be smaller than or equal to that of the second graphite.

In an implementation, the average particle diameter $D_{50}$ of the flake graphite may be smallest, and the average particle diameter $D_{50}$ of the first graphite may be largest.

The flake graphite may be included in an amount of, e.g., about 5% or less by weight, based on a total weight of the composite anode active material.

Maintaining the amount of the flake graphite within the range stated above, e.g., about 5% by weight or less, based on the total weight of the composite anode active material, may help prevent deterioration of the initial efficiency of battery, and may help maintain the adhesion between an electrode plate and materials.

In an implementation, the silicon-carbon composite and a mixed graphite including the first graphite and the second graphite may be in a weight ratio of about 95:5 to about 80:20. In an implementation, the silicon-carbon composite and the mixed graphite may be in a weight ratio of, e.g., about 90:10 to about 80:20. In an implementation, the silicon-carbon composite and the mixed graphite may be in a weight ratio of about 90:10 to about 85:15.

According to another embodiment, provided is an anode including the above-described composite anode active material.

In an implementation, the anode may have an area disorder of, e.g., about 0.6 or less, as evaluated by a distribution diagram based on Delaunay triangulation.

The area disorder may be measured by identifying triangles (resulting from Delaunay triangulation) using Delaunay Voronoi theory, the triangles obtained by connecting points each corresponding to a location of a Si particle.

In an implementation, the area disorder may be obtained by Equation 2.

$$\text{Area disorder (A.D)} = 1 - 1/(1 + (\text{standard deviation of triangle areas/average of triangle areas})). \quad \text{<Equation 2>}$$

Here, the smaller the area disorder, the higher the degree of dispersion of Si particles, and a theoretical minimum area disorder value is 0.

According to another embodiment, provided is a lithium secondary battery comprising a cathode; the above-described anode; and an electrolyte.

The lithium secondary battery may be manufactured in the following manner.

First, the above-described anode may be prepared.

The anode may include a binder between an anode current collector and an anode active material layer or within the anode active material layer. The binder will later be described in detail.

The lithium secondary battery including the anode and the binder may be manufactured in the following manner.

The anode may include the above-described composite anode active material, and may be prepared by, e.g., mixing the composite anode active material in a solvent to prepare an anode active material composition and then forming the prepared composition so as to have a certain shape, or coating the anode active material composition on a current collector such as a copper foil.

The binder used in the anode active material composition, which is a component facilitating the binding the anode active material with a conducting agent or the like and binding with a current collector, may be included between the anode current collector and the anode active material layer or within the anode active material layer, and may be included in an amount of about 1 part to about 50 parts by weight, based on 100 parts by weight of the anode active material. In an implementation, the binder may be included in an amount in a range of about 1 part to about 30 parts by weight, about 1 part to about 20 parts by weight, or about 1 part to about 15 parts by weight, based on 100 parts by weight of the anode active material.

Examples of the binder may include polyvinylidenefluoride, polyvinylidenechloride, polybenzimidazole, polyamide, polyvinylacetate, polyacrylonitrile, polyvinylalcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrilebutadienstyrene, phenol resin, epoxy resin, polyethyleneterephthalate, polytetrafluorethylene, polyphenylene sulfide, polyamideimde, polyetherimde, polyethersulfone, polyamide, polyacetal, polyphenyl oxide, polybuthyleneterephthalate, ethylene-propylene-diene monomer (EPDM), sulfonated EPDM, styrene butadiene rubber (SBR), a fluororubber, and a variety of copolymers.

The anode may further include a separate conducting agent to further enhance electrical conductivity by providing a conduction pathway to the anode active material. A suitable conducting agent for use in a lithium battery in the art may be used, and examples thereof may include a carbon material such as carbon black, acetylene black, ketjen black, carbon fibers (e.g., vapor grown carbon fiber); a metal based material such as powder or fibers of a metal such as copper, nickel, aluminum or silver; a conductive polymer such as a polyphenylene derivative, or a mixture thereof.

As the solvent, e.g., N-methylpyrrolidone (NMP), acetone or water may be used. The solvent may be included in an amount of about 1 part to about 10 parts by weight, based on 100 parts by weight of the anode active material. When the amount of the solvent is within the range stated above, a process for forming an active material layer may be facilitated.

In an implementation, the current collector may be formed to a thickness of about 3 μm to about 500 μm. The current collector may be a suitable material that does not cause chemical change to the battery has conductivity, and examples thereof may include copper, stainless steel, aluminum, nickel, titanium, sintered carbon, copper or stainless steel surface-treated with carbon, nickel, titanium, or silver, or an aluminum-cadmium alloy. In an implementation, the anode current collector may have fine roughness on a surface thereof so as to enhance adhesive strength of an anode active material to the anode current collector, and may be used in any suitable forms including a film, a sheet, a foil, a net, a porous structure, a foam, and a non-woven fabric.

The anode active material composition may be directly coated on the current collector, or may be cast on a separate support, and an anode active material film separated from the support may then be laminated on a copper current collector, thereby preparing an anode plate. The anode may have other suitable shapes.

The anode active material composition may be used not only for preparation of an electrode of a lithium battery but also for manufacture of a printable battery in such a manner that it is printed on a flexible electrode substrate.

Next, a cathode is prepared.

In an implementation, a cathode active material composition including a cathode active material, a conducting agent, a binder, and a solvent mixed therein, may be prepared. The cathode active material composition may be directly coated on a metal current collector to prepare a cathode plate. In an implementation, the cathode active material composition may be cast on a separate support, and a cathode active material film separated from the support may then be laminated on a metal current collector, thereby preparing a cathode plate. The cathode may have other suitable shapes.

A suitable lithium-containing metal oxide available as a cathode active material may be used. In an implementation, one or more composite oxides of a metal selected from cobalt, manganese, nickel, or a combination thereof, and lithium may be used. In an implementation, the lithium-containing metal oxide may be a compound represented by one or more of the formulae selected from $Li_aA_{1-b}B^1_bD^1_2$ (where $0.90 \leq a \leq 1.8$, and $0 \leq b \leq 0.5$); $Li_aE_{1-b}B^1_bO_{2-c}D^1_c$ (where $0.90 \leq a \leq 1.8$, $0 \leq b \leq 0.5$, and $0 \leq c \leq 0.05$); $LiE_{2-b}B^1_bO_{4-c}D^1_c$ (where $0 \leq b \leq 0.5$, and $0 \leq c \leq 0.05$); $Li_aNi_{1-b-c}Co_bB^1_cD^1_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB^1_cO_{2-\alpha}F^1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB^1_cO_{2-\alpha}F^1_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1_cD^1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1_cO_{2-\alpha}F^1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1_cO_{2-\alpha}F^1_2$ (where $0.90 \leq a \leq 1.8$, $0 \leq b \leq 0.5$, $0 \leq c \leq 0.05$, and $0 < \alpha < 2$); $Li_aN-i_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be Ni, Co, Mn, or a combination thereof; $B^1$ may be Al, Ni, Co, Mn, Cr, Fe, Mg, Sr, V, a rare earth element, or a combination thereof; $D^1$ may be O, F, S, P, or a combination thereof; E may be Co, Mn, or a combination thereof; $F^1$ may be F, S, P, or a combination thereof; G may be Al, Cr, Mn, Fe, Mg, La, Ce, Sr, V, or a combination thereof; Q may be Ti, Mo, Mn, or a combination thereof; $I^1$ may be Cr, V, Fe, Sc, Y, or a combination thereof; and J may be V, Cr, Mn, Co, Ni, Cu, or a combination thereof.

In an implementation, the lithium-containing metal oxide may be, e.g., $LiCoO_2$, $LiMn_xO_{2x}$ (x=1, 2), $LiNi_{1-x}Mn_xO_{2x}$ ($0 < x < 1$), $LiNi_{1-x-y}Co_xMn_yO_2$ ($0 \leq x \leq 0.5$, and $0 \leq y \leq 0.5$), or $LiFePO_4$.

In an implementation, at least one of the compounds described above used as a cathode active material may have a coating layer on its surface. In the case where the at least one compound does not have a coating layer formed thereon, the at least one compound may be used in combination with a compound having coating layer. The coating layer may include a coating element compound, such as an oxide of a coating element, a hydroxide of a coating element, an oxyhydroxide of a coating element, an oxycarbonate of a coating element, or a hydroxy carbonate of a coating element. The compound constituting the coating layer may be amorphous or crystalline. Examples of the coating element included in the coating layer may include Mg, Al, Co, K, Na, Ca, Si, Ti, V, Sn, Ge, Ga, B, As, Zr, or a mixture thereof. A suitable coating method (e.g., spray coating or immersion) that does not adversely affect physical properties of a cathode active material by using these coating elements in the compound may be employed as a coating layer forming process.

In an implementation, the conducting agent may include, e.g., carbon black, graphite micro particles, or the like. A suitable conducting agent available as a conductive material may be used.

The binder may include, e.g., vinylidene fluoride/hexafluoropropylene copolymer, polyvinylidene fluoride (PVDF), polyacrylonitrile, polymethylmethacrylate, polytetrafluoroethylene, mixtures thereof, and styrene butadiene rubber polymer, or other suitable binder.

In an implementation, the solvent may include, e.g., N-methylpyrrolidone (NMP), acetone, water, or another suitable solvent.

The amounts of the cathode active material, the conducting agent, and the solvent may be used at the same levels as suitably used in a lithium battery. In an implementation, according to the use and configuration of the lithium battery, at least one of the conducting agent, the binder, and the solvent may not be included in the lithium battery.

Next, a separator interposed between the cathode and the anode may be prepared.

The separator may be a suitable separator used in lithium batteries. In an implementation, the separator may have low resistance to migration of ions in an electrolyte and may have a high electrolyte-retaining ability. In an implementation, the separator may include, e.g., glass fiber, polyester, Teflon, polyethylene, polypropylene, polytetrafluoroethylene (PTFE) or a combination thereof, each of which may be a nonwoven fabric or a woven fabric. In an implementation, a windable separator such as polyethylene, polypropylene, or the like may be used for a lithium ion battery, and a separator having an excellent organic electrolyte retaining capacity may be used for a lithium-ion polymer battery. In an implementation, the separator may be prepared in the following manner.

A polymer resin, a filler, and a solvent are mixed to prepare a separator composition. The separator composition may be directly coated on an electrode, and then dried to form a separator. In an implementation, the separator composition may be cast on a support and dried, and a separator film separated from the support is then laminated on the electrode, thereby forming the separator.

A suitable polymer resin that is used for binding electrode plates in lithium batteries may be used. In an implementation, the binder resin may include, e.g., vinylidene fluoride/hexafluoropropylene copolymer, polyvinylidene fluoride (PVDF), polyacrylonitrile, polymethylmethacrylate, or mixtures thereof.

Next, an electrolyte may be prepared.

In an implementation, the electrolyte may be an organic electrolytic solution. In an implementation, the electrolyte may be a solid electrolyte. In an implementation, the solid electrolyte may include, e.g., boron oxide, and lithium oxynitride, or another suitable solid electrolyte. The solid electrolyte may be formed on the anode by, e.g., sputtering.

In an implementation, the organic electrolyte may be prepared by dissolving a lithium salt in the organic solvent.

A suitable organic solvent may be used. In an implementation, the organic solvent may include, e.g., propylenecarbonate, ethylencarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahydrofuran, γ-butyrolactone, dioxorane, 4-methyldioxorane, N,N-dimethylformamide, dimethylacetamide, dimethylsulfoxide, dioxane, 1,2-dimethjoxyethane, sulforane, dichloroethane, chlorobenzene, nitrobenzene, diethyleneglycol, dimethylether, or a combination thereof.

A suitable lithium salt may be used. In an implementation, the lithium salt may include, e.g., $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are a natural number), LiCl, LiI, or a combination thereof.

Figure 3:
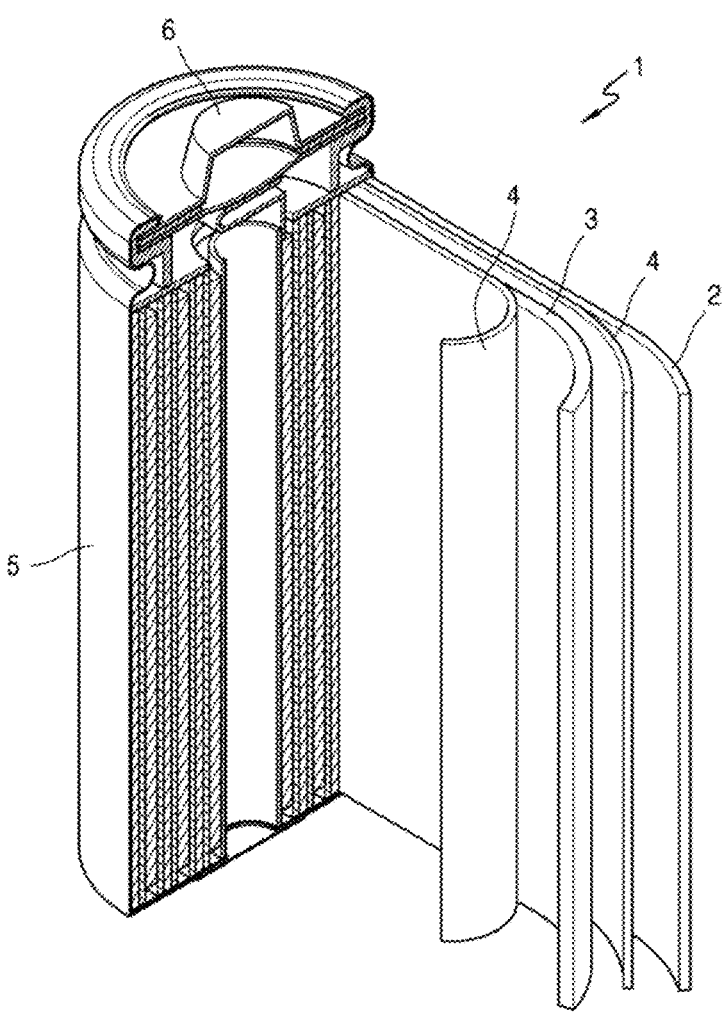
FIG. 3 is a schematic view illustrating a structure of a lithium secondary battery according to an embodiment.

As illustrated in FIG. 3, the lithium battery 1 may include a cathode 3, an anode 2 and a separator 4. The cathode 3, the anode 2, and the separator 4 may be wound or folded to be accommodated in the battery case 5. Next, an organic electrolyte may be injected into the battery case 5, followed by sealing with a cap assembly 6, thereby completing the lithium battery 1. The battery case 5 may have, e.g., a cylindrical shape, a prismatic shape, or a thin-film shape. In an implementation, the lithium battery 1 may be a thin-film battery. The lithium battery 1 may be a lithium ion battery.

The separator may be between the cathode and the anode, thereby forming a battery assembly. The battery assembly may be stacked in a bi-cell structure and impregnated into an organic electrolytic solution, and then put into a pouch and hermetically sealed, thereby completing the manufacture of a lithium ion polymer battery.

In an implementation, the battery assembly may include a plurality of battery assemblies stacked to form a battery pack, which may be used for any kind of devices requiring high capacity and high power output. In an implementation, the lithium secondary battery may be suitable for use in a laptop computer, a smart phone, or an electric vehicle.

In an implementation, the lithium secondary battery may have excellent lifespan and high-rate capabilities, and may be used in an electric vehicle (EV). In an implementation, the lithium secondary battery may be suitable for use in a hybrid car, such as a plug-in hybrid electric vehicle (PHEV). In an implementation, the lithium secondary battery may be used in the field requiring to store a large amount of power. In an implementation, the lithium secondary battery may be used in an electric bike, or an electrically driven tool.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Composite Anode Active Material

Preparation Example 1: Porous Silicon Composite
Nanocluster+Artificial Graphite (Large
Particles)+Natural Graphite (Large Particles)

Needle-like silicon was pulverized to obtain plate- and needle-like silicon particles having a length of about 125 nm and a thickness of about 40 nm, each having a silicon oxide ($SiO_x$) film (0<x<2) (thickness: about 0.1 nm) formed thereon.

The plate- and needle-like silicon particles were dispersed in alcohol to then be subjected to spray-drying, followed by drying, thereby obtaining porous silicon secondary particles having an average particle diameter of about 3 μm to about 6 μm.

The spray-drying was performed using a spray dryer (model name: MMSD Micro Mist Spray Dryers manufactured by Fujisaki Electric).

The porous silicon secondary particles were placed in a reactor. $CH_4$ gas was allowed to flow into the reactor, and thus created an atmosphere of the gas mixture. The pressure generated in the reactor by the flow of the gas mixture was 1 atm. Under the gas atmosphere, the internal temperature of the reactor was raised to 1,000° C. and heat treatment was performed by maintaining the reactor at the temperature while continuously allowing the gas to flow into the reactor, thereby forming graphene nanosheets on the needle-like silicon particles. Thereafter, the reactor was cooled to ambient temperature (25° C.), thereby obtaining a porous silicon composite nanocluster.

Figure 5:
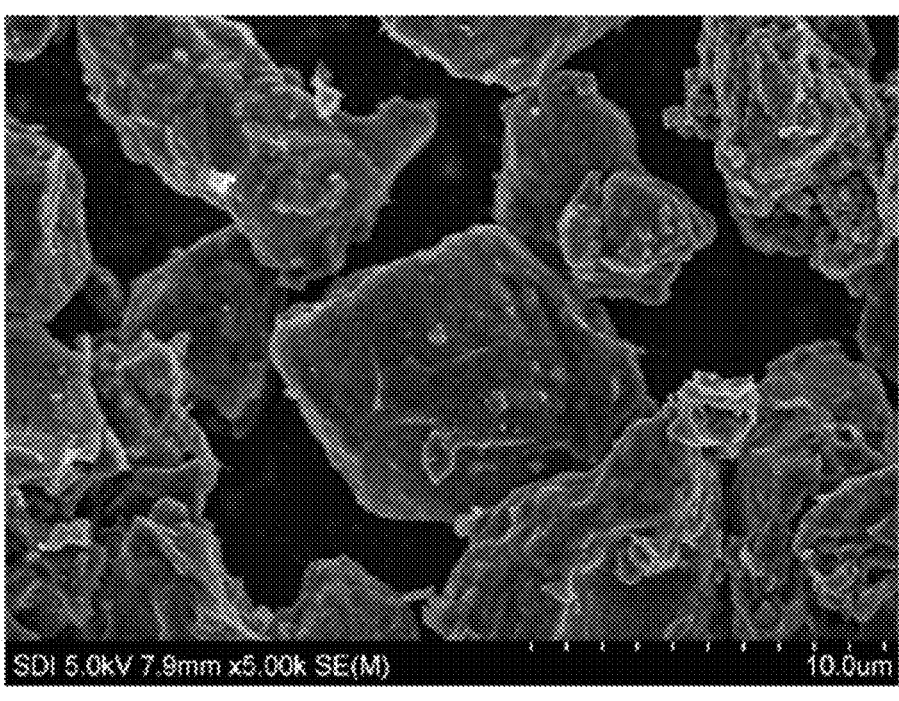
FIG. 5 illustrates an SEM image of a porous silicon composite nanocluster used in Preparation Example 1.

The content of each of first graphene and second graphene in the porous silicon composite nanocluster was about 20 parts by weight, based on 100 parts by weight of the porous silicon composite nanocluster. A SEM image of the porous silicon composite nanocluster is illustrated in FIG. 5. The average particle diameter $D_{50}$ of the porous silicon composite nanocluster was 10.71 μm.

Figure 6A:
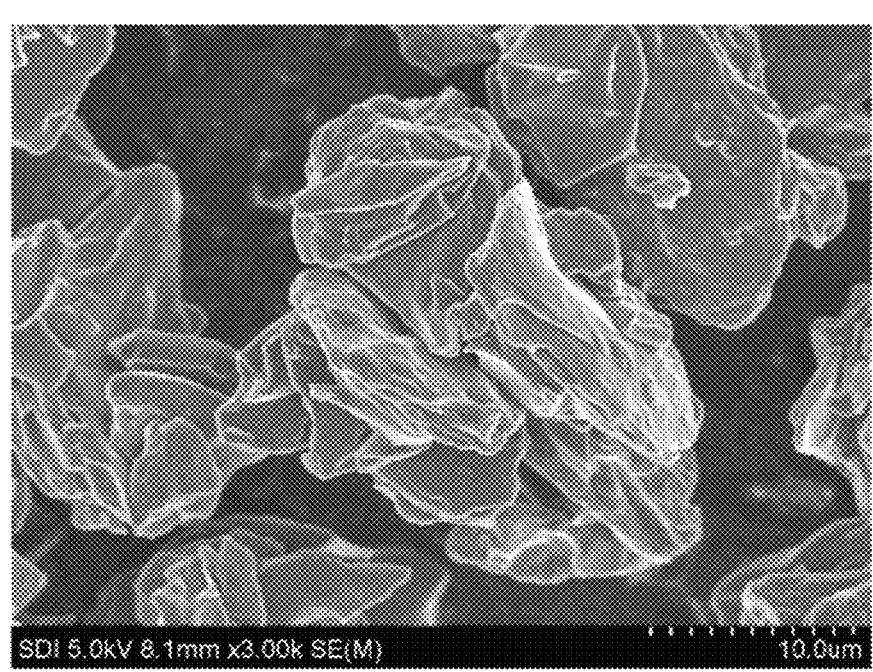
FIGS. 6A and 6B are SEM images illustrating artificial graphite and natural graphite used in Preparation Example 1.
Figure 6B:
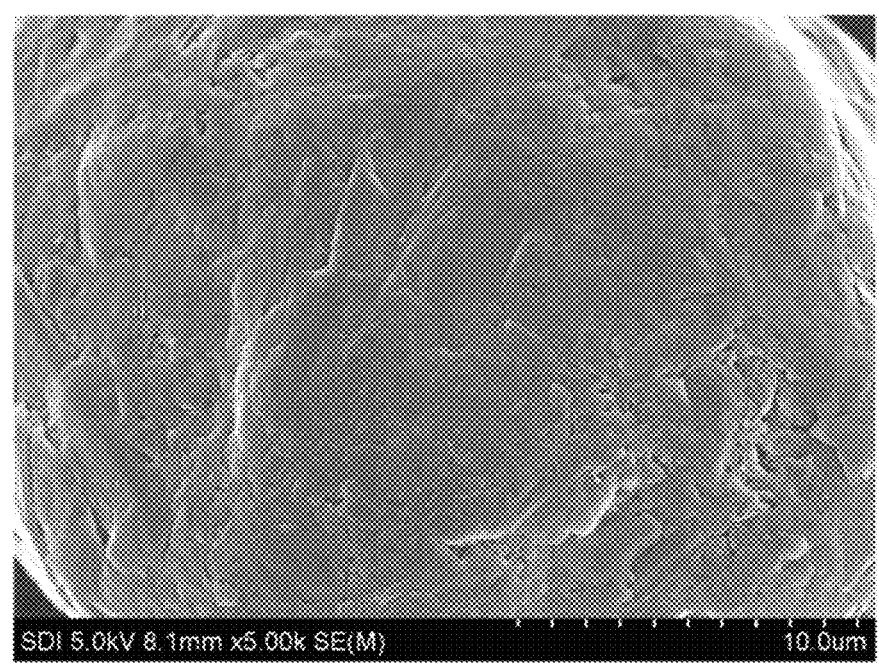

An anode active material composition was prepared by mixing 14 wt % of the porous silicon composite nanocluster, 39.45 wt % of artificial graphite ($D_{50}$=19.77 μm), and 39.45 wt % of natural graphite ($D_{50}$=27.40 μm) with 4.9 wt % of flake graphite ($D_{50}$=4.6 μm), 1.2 wt % of styrene butadiene rubber (SBR), and 1.0 wt % of CMC, and the prepared anode active material composition was coated on a copper foil at a coating density of 7.0 mg/cm², followed by compressing and drying, thereby preparing an anode. Here, SEM images of the artificial graphite and the natural graphite are illustrated in FIGS. 6A and 6B, respectively.

Preparation Example 2: Porous Silicon Composite
Nanocluster+Artificial Graphite (Relatively Large
Particles)+Natural Graphite (Relatively Large
Particles)

An anode was prepared in the same manner as in Preparation Example 1, except that artificial graphite ($D_{50}$=20.9 μm) and natural graphite ($D_{50}$=33.8 μm) were used, instead of artificial graphite ($D_{50}$=19.77 μm) and natural graphite ($D_{50}$=27.40 μm), respectively.

Comparative Preparation Example 1: Porous
Silicon Composite Nanocluster+Artificial Graphite
2+Conducting Agent An anode was prepared in the same manner as in Preparation Example 1, except that an anode active material composition was prepared by mixing 14.4 wt % of the porous silicon composite nanocluster, 78.5 wt % of artificial graphite ($D_{50}$=19.77 μm), 4.9 wt % of flake graphite ($D_{50}$=4.6 μm), 1.2 wt % of styrene butadiene rubber (SBR), and 1.0 wt % of CMC.

Comparative Preparation Example 2:
Graphite-Containing Silicon-Carbon
Composite+Artificial Graphite 2+Conducting Agent An anode was prepared in the same manner as in Preparation Example 1, except that an anode active material composition was prepared by mixing 17.6 wt % of graphite-containing silicon-carbon composite, 75.3 wt % of artificial graphite ($D_{50}$=19.77 μm), 4.9 wt % of flake graphite ($D_{50}$=4.6 μm), 1.2 wt % of styrene butadiene rubber (SBR), and 1.0 wt % of CMC.

The graphite-containing silicon-carbon composite is a material obtained by mixing Si:graphite:pitch at a weight ratio of 40:40:20. Here, the Si included milled Si particles, which had an average particle diameter $D_{50}$ of 100 nm, and a crystal particle size of 8.5 nm, and the average particle diameter $D_{50}$ of the graphite-containing silicon-carbon composite was about 13 μm.

Figure 7:
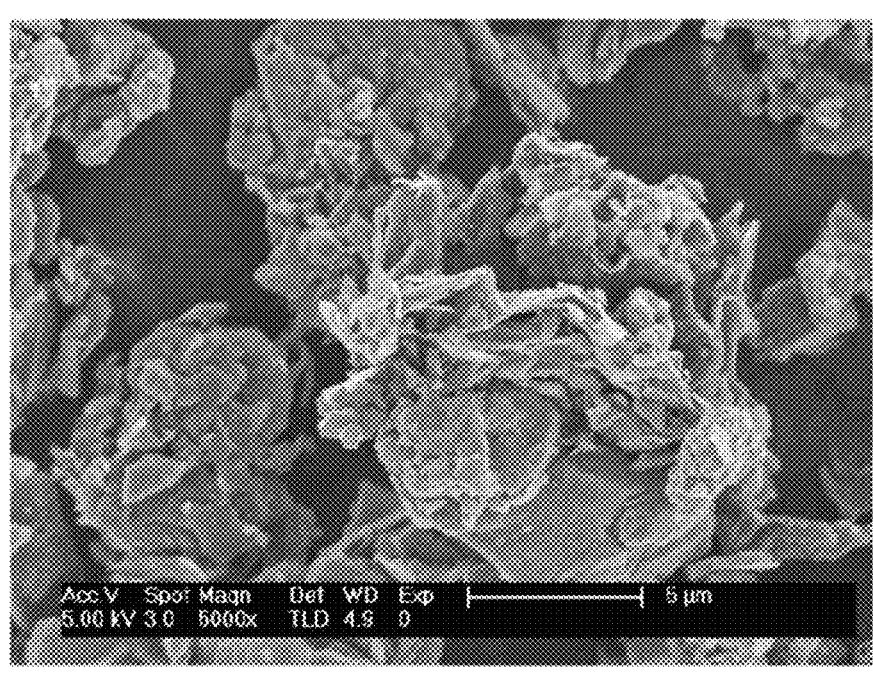
FIG. 7 is an SEM image illustrating a silicon-carbon composite used in Comparative Preparation Example 1.

A SEM image of the resulting silicon-carbon composite is illustrated in FIG. 7. The average particle diameter $D_{50}$ of the silicon-carbon composite was 13.09 μm.

An anode was prepared in the same manner as in Comparative Preparation Example 1, except that a silicon-carbon composite, instead of the porous silicon composite nanocluster, was used.

Comparative Preparation Example 3: Porous Silicon Composite Nanocluster+Artificial Graphite (Normal Sized Particles)+Natural Graphite (Normal Sized Particles)

Figure 8A:
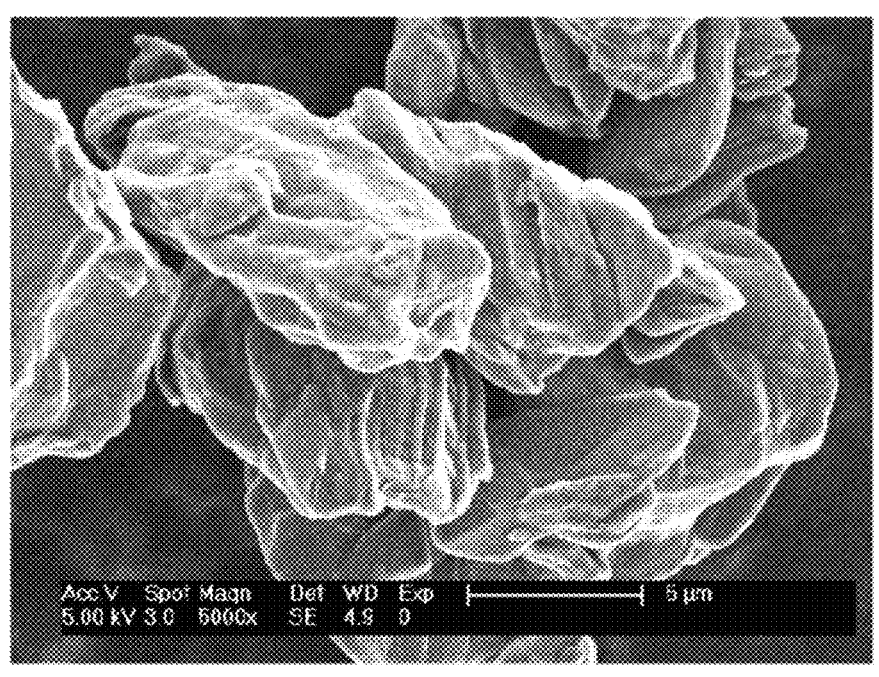
FIGS. 8A and 8B are SEM images illustrating artificial graphite and natural graphite used in Comparative Preparation Example 3.
Figure 8B:
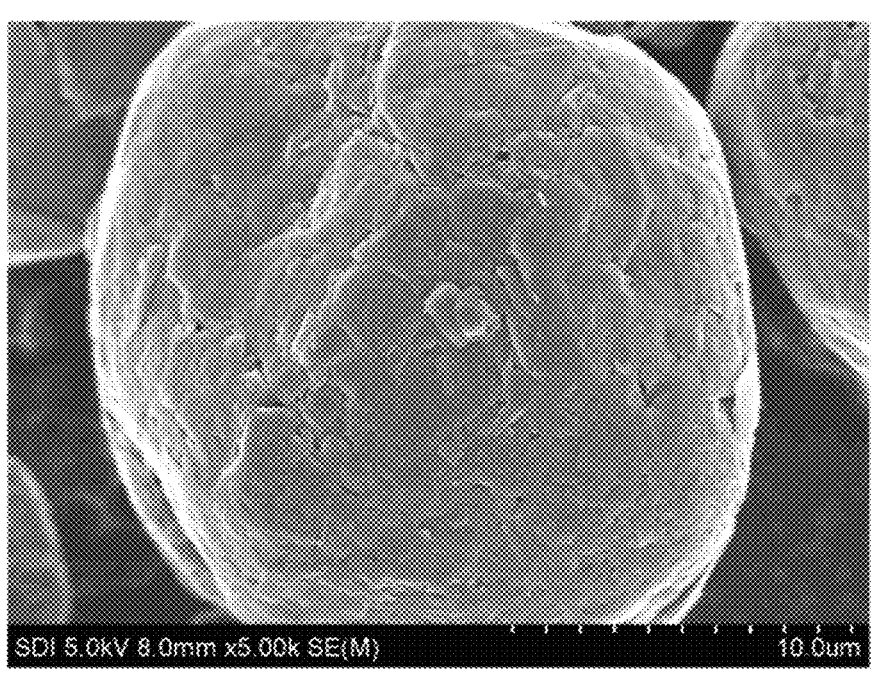

An anode was prepared in the same manner as in Preparation Example 1, except that artificial graphite ($D_{50}$=18.74 μm) and natural graphite ($D_{50}$=22.23 μm) were used, instead of artificial graphite ($D_{50}$=19.77 μm) and natural graphite ($D_{50}$=27.40 μm), respectively. SEM images of the artificial graphite and the natural graphite are illustrated in FIGS. 8A and 8B.

Comparative Preparation Example 4: Porous Silicon Composite Nanocluster+Natural Graphite (Small Particles)

An anode was prepared in the same manner as in Preparation Example 1, except that artificial graphite was not used, and natural graphite ($D_{50}$=18.0 μm) was used instead of natural graphite ($D_{50}$=27.40 μm).

Comparative Preparation Example 5: Porous Silicon Composite Nanocluster+Natural Graphite (Relatively Large Particles)

An anode was prepared in the same manner as in Preparation Example 1, except that artificial graphite was not used, and natural graphite ($D_{50}$=33.8 μm) was used instead of natural graphite ($D_{50}$=27.40 μm).

Comparative Preparation Example 6: Porous Silicon Composite Nanocluster+Artificial Graphite (Small Particles)

An anode was prepared in the same manner as in Preparation Example 1, except that natural graphite was not used, and artificial graphite ($D_{50}$=17.8 μm) was used instead of artificial graphite ($D_{50}$=19.77 μm).

Comparative Preparation Example 7: Porous Silicon Composite Nanocluster+Artificial (Relatively Large Particles)

An anode was prepared in the same manner as in Preparation Example 1, except that natural graphite was not used, and artificial graphite ($D_{50}$=20.9 μm) was used instead of artificial graphite ($D_{50}$=19.77 μm).

Evaluation Example 1 (Evaluation of Average Particle Diameters)

Figure 4:
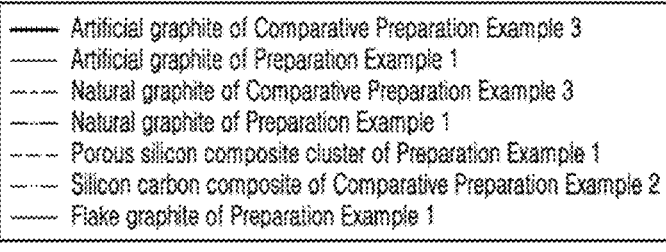
FIG. 4 is a graph illustrating average particle diameter distributions of a silicon-carbon composite including artificial graphite, natural graphite, and graphite, a porous silicon composite nanocluster, and flake graphite used in the Examples and Comparative Examples.
Figure 4:
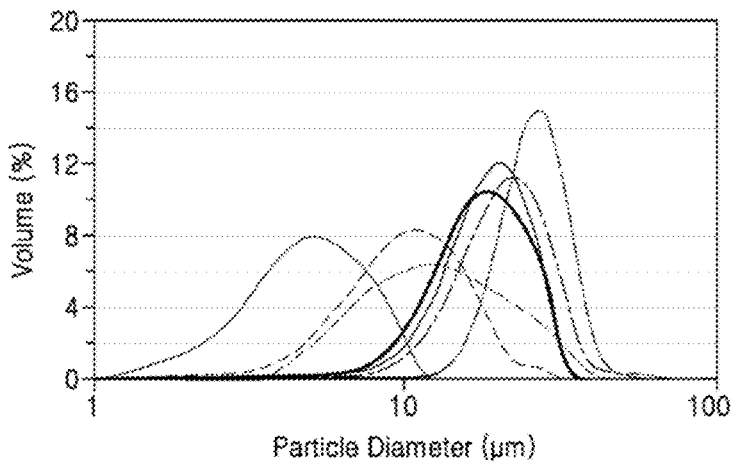

Average particle diameter of the porous silicon composite nanocluster, the artificial graphite, the natural graphite, and the flake graphite, used in Preparation Example 1, the silicon-carbon composite used in Comparative Preparation Example 2, and the artificial graphite and the natural graphite, used in Comparative Preparation Example 3, were measured, and the results thereof are illustrated in FIG. 4.

Evaluation Example 2 (Evaluation of Area Disorder)

Figure 9A:
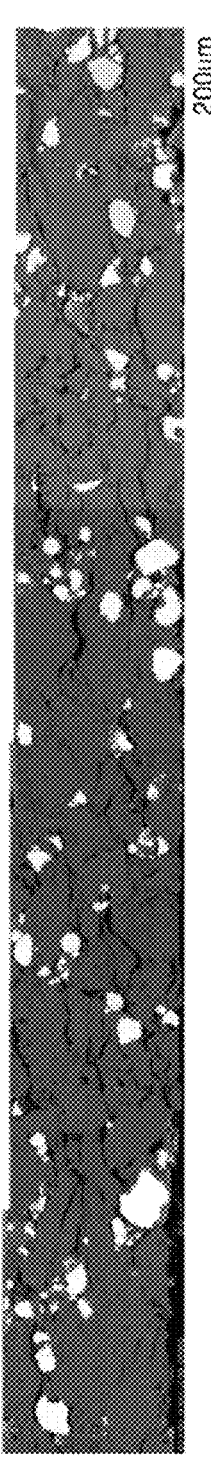
FIGS. 9A and 9B illustrate SEM images of a cross-section of an anode plate used in Preparation Example 1 and a triangle distribution thereof produced by Delaunay triangulation.
Figure 10A:
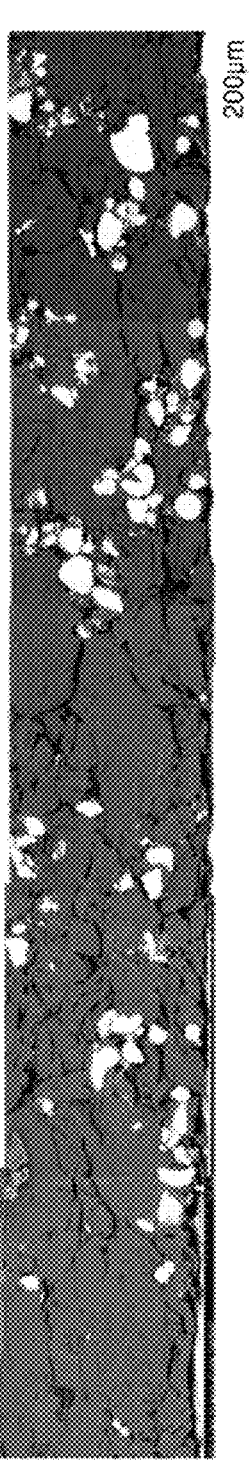
FIGS. 10A and 10B illustrate SEM images of a cross-section of an anode plate used in Comparative Preparation Example 1 and a triangle distribution thereof produced by Delaunay triangulation.

SEM images of the anodes prepared in Preparation Example 1 and Comparative Preparation Example 3 are illustrated in FIGS. 9A and 10A.

Figure 9B:
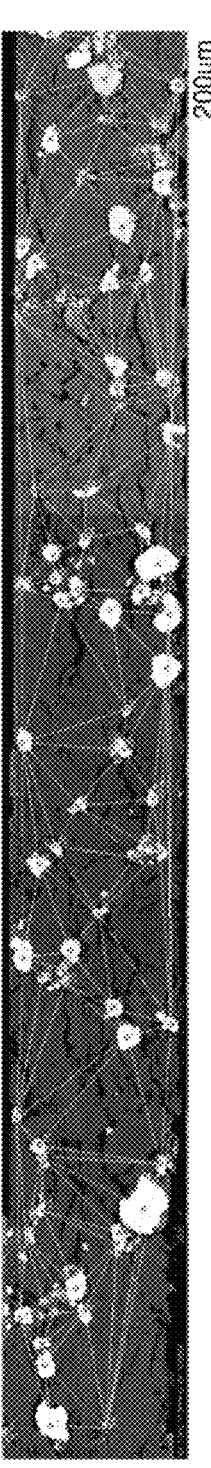
Figure 10B:
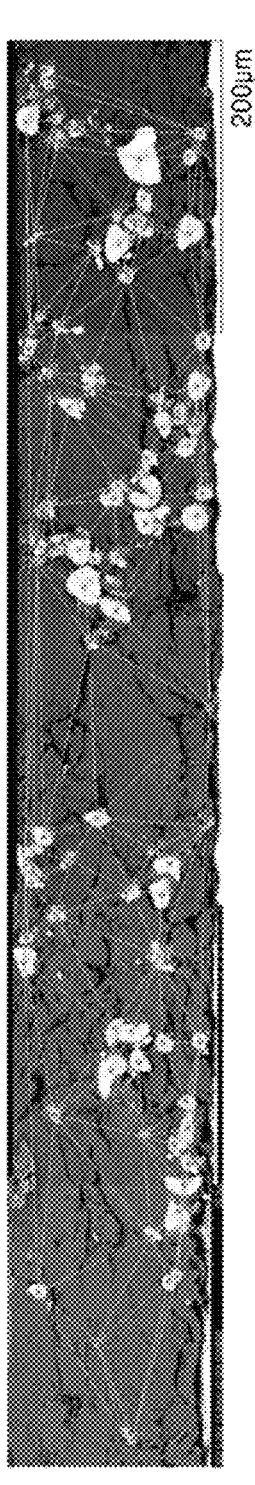

Next, the anodes were evaluated by distributions of triangles resulting from Delaunay triangulation, and processes of performing triangulation on the respective anodes are illustrated in FIGS. 9B and 10B, respectively.

The results showed that the anode of Preparation Example 1 had an area disorder of 0.524 and the anode of Comparative Preparation Example 1 had an area disorder of 0.601.

Consequently, it is identified that the anode of Preparation Example 1, in which natural graphite and artificial graphite having relatively large particles were both used, had a lower area disorder than that of Comparative Preparation Example 3, revealing that the former had a higher degree of Si dispersion.

Evaluation Example 3 (Evaluation of Rate Capabilities)

Electrode plate coating densities of the anode of Preparation Examples 1 and 2 and Comparative Preparation Examples 1 to 7, and full charge expansion ratios of the anodes of Preparation Example 1 and Comparative Preparation Example 3 after the formation process of the respective anodes, were measured, and the results are summarized in Table 2.

Subsequently, 2032 type coin half cells (CHCs) were manufactured using the anodes of Preparation Examples 1 and 2 and Comparative Preparation Examples 1 to 7 and a lithium metal counter electrode. A porous polyethylene (PE) film as a separator (thickness: about 20 μm) was disposed between the cathode and the lithium metal counter electrode, and an electrolytic solution was injected into the resulting product, thereby manufacturing the 2032 type coin half cells.

The formation charge capacity, formation discharge capacity, formation efficiency, standard discharge capacity, rated capacity of a silicon composite nanocluster (SCN) alone, discharge rate and charge rate of each CHC, were measured, and the results are summarized in Table 2.

Each of the CHCs of Examples 1 and 2 and Comparative Examples 1 to 7 was charged with a constant current of 0.1 C at a temperature of 25° C. until a voltage thereof reached 0.01 V (vs. Li), and maintained at 0.01 V in a constant voltage mode until a current thereof reached a cut-off current of 0.01 C. Next, the CHC was discharged with a constant current of 0.1 C until a voltage thereof during discharge reached 1.5 V (vs. Li), thereby completing a formation process.

Each of the lithium batteries resulting after the formation process was charged with a constant current of 0.2 C at a temperature of 25° C. until a voltage thereof reached 0.01 V (vs. Li), and then maintained at 0.01 V in a constant voltage mode until a current thereof reached a cut-off current of 0.01 C. Then, the lithium battery was discharged with a constant current of 0.2 C until a voltage thereof reached 1.5 V (vs. Li), thereby completing a standard capacity process.

The discharge rate capability of the lithium battery resulting after the standard capacity process was measured at 25° C., followed by measuring the charge rate capability thereof.

The reference in measuring the discharge rate is a discharge capacity measured at 0.2 C rate in the standard capacity process, and discharge rates are measured at varying current densities of 0.5 C, 1.0 C, 2.0 C, and 3.0 C in that order.

The lithium battery having undergone the standard capacity process was charged under constant current and constant voltage (CC-CV) of 0.2 C and 0.01 V until a current thereof reached a cut-off current of 0.01 C, and then discharged with a constant current (CC) of 0.5 C until a voltage thereof reached a cut-off voltage of 1.5 V, thereby obtaining a 0.5 C discharge rate capability as a ratio of 0.2 C rate discharge capacity to 0.5 C rate discharge capacity. The measuring of the discharge rate capability is followed by performing residual discharges (0.2 C rate discharging and discharging of all CHCs having a discharge capacity of less than 0.2 C rate discharge capacity).

Each of the lithium batteries resulting after measuring the discharge rate capability is charged under constant current and constant voltage (CC-CV) of 0.1 C and 0.01 V until a current thereof reached a cut off current of 0.01 C, and then discharged with a constant current (CC) of 0.2 C until a voltage thereof reached a cut off voltage of 1.5 V.

Thereafter, 0.2 C rate charging under constant current and constant voltage (CC-CV) and 0.2 C discharging in a constant current (CC) mode were conducted (standard capacity measured at 0.2 C charge), and charge rates were then measured at varying current densities.

The discharge and charge capabilities of the coin cells are defined by Equations 1 and 2:

Discharge rate ($x$ C/0.2 C) capability [%]=[1.5 V cut off capacity at $x$ C rate/1.5 V cut off capacity at 0.2 C rate]×100 <Equation 1>

Charge rate capability [%]=[CC charge capacity at $x$ C rate with 0.01 V cut off/CC charge capacity at 0.2 C rate with 0.01 V cut off]×100 <Equation 2>

In addition, the rate and capacity capabilities of the respective batteries were evaluated in the following manner.

1) Formation charge:

Step 1: CC charging at 0.1 C [Cut off: 0.01 V]

Step 2: CV charging at 0.1 C and maintaining at 0.01 V [Cut off: 0.01 C]

2) Formation discharge: CC discharging at 0.1 C [Cut off: 1.5 V]

3) Formation efficiency: Formation discharge capacity/ Formation charge capacity 4) Standard discharge: CC-CV discharging at 0.2 C and maintaining at 0.01 V [Cut off: 0.01 C], followed by CC discharging at 0.2 C [Cut off: 1.5 V]

5) Rated capacity of porous silicon composite nanocluster (SCN) alone:

TABLE 2

| Characteristics | | Preparation Example 1 | Comparative Preparation Example 3 | Preparation Example 2 | Comparative Preparation Example 4 | Comparative Preparation Example 5 | Comparative Preparation Example 6 | Comparative Preparation Example 7 |
|---|---|---|---|---|---|---|---|---|
| Electrode plate coating density (g/cc) | | 0.95 | 0.92 | 0.91 | 0.98 | 1.01 | 0.90 | 0.86 |
| Full charge expansion ratio (%) after formation | | 40 | 44 | — | — | — | — | — |
| CHC | Formation Charge (mAh/g) | 555.3 | 552.2 | 558.9 | 573.1 | 572.0 | 566.0 | 567.3 |
| | Formation discharge capacity (mAh/g) | 500.0 | 498.1 | 503.5 | 512.0 | 513.3 | 503.8 | 504.8 |
| | Formation Efficiency (%) | 90.0 | 90.2 | 90.1 | 89.3 | 89.7 | 89.0 | 89.0 |
| | Standard discharge capacity (mAh/g) | 493.7 | 491.2 | 496.1 | 506.2 | 505.9 | 493.5 | 495.2 |
| | Rated Capacity of SCN alone | 1384.8 | 1367.4 | 1401.9 | 1442.0 | 1440.3 | 1355.5 | 1367.0 |
| | Discharge Rate (2 C/0.2 C) (%) | 96.5 | 95.7 | 94.6 | 95.9 | 95.3 | 94.0 | 94.1 |
| | Charge Rate (2 C/0.2 C) (%) | 44.7 | 45.0 | 44.1 | 38.9 | 37.6 | 40.2 | 40.0 |

Referring to Table 2, it may be seen that the anode of Preparation Example 1 had an increased coating density, compared to that of Comparative Preparation Example 3, and this is attributed to an electrode plate characteristic that the coating density tends to increase in the anode active material having a high tap density. Accordingly, it is understood that the composite anode active material used in Example 1 had a higher tap density than that used in Comparative Preparation Example 3.

In addition, it may be seen that the rated capacity and discharge rate of the SCN alone of Preparation Example 1 was increased, compared to that of Comparative Preparation Example 3, which is attributed to the formation of enhanced conduction pathways owing to the strengthened Si dispersion.

Manufacture of Coin Full Cells

Example 1

First, 97 g of $LiNi_{1/3}Co_{1/3}Al_{1/3}O_2$ as a lithium composite oxide, 2 g of polyvinylidene fluoride, 47 g of N-methyl N-methyl-pyrrolidone as a solvent, and 1 g of carbon black as a conducting agent, were mixed. Bubbles were removed from the resulting mixture using a mixer, thereby preparing a uniformly dispersed composition for forming a cathode active material layer.

The composition prepared by the above-described process was coated on an aluminum foil using a doctor blade to form a thin electrode plate. The thin electrode plate was then dried at a temperature of 135° C. for at least 3 hours, and then pressed and vacuum-dried, thereby manufacturing a cathode.

The anode of Preparation Example 1 was used as an anode.

A 2032 type coin full cell was manufactured using the cathode and the anode. A porous polyethylene (PE) film as a separator (thickness: about 20 μm) was disposed between the cathode and a lithium metal counter electrode, and an electrolytic solution was injected into the resulting product, thereby manufacturing the 2032 type coin full cell.

As the electrolytic solution, a solution containing 1.5 M $LiPF_6$ and 3.5 wt % of FEC dissolved in a mixed solvent of EC, DEC, and FEC at a volume ratio of 2:1:7, was used.

Example 2

A coin full cell was manufactured in the same manner as in Example 1, except that the anode of Preparation Example 2 was used.

Comparative Example 1

A coin full cell was manufactured in the same manner as in Example 1, except that the anode of Comparative Preparation Example 1 was used.

Comparative Example 2

A coin full cell was manufactured in the same manner as in Example 1, except that the anode of Comparative Preparation Example 2 was used.

Comparative Example 3

A coin full cell was manufactured in the same manner as in Example 1, except that the anode of Comparative Preparation Example 3 was used.

Comparative Example 4

A coin full cell was manufactured in the same manner as in Example 1, except that the anode of Comparative Preparation Example 4 was used.

Comparative Example 5

A coin full cell was manufactured in the same manner as in Example 1, except that the anode of Comparative Preparation Example 5 was used.

Comparative Example 6

A coin full cell was manufactured in the same manner as in Example 1, except that the anode of Comparative Preparation Example 6 was used.

Comparative Example 7

A coin full cell was manufactured in the same manner as in Example 1, except that the anode of Comparative Preparation Example 7 was used.

Evaluation Example 1 (Evaluation of Lifespan Characteristic)

1) The coin full cells manufactured in Example 1 and Comparative Examples 1 and 2 were charged with a constant current of 0.1 C at a temperature of 25° C. until a voltage thereof reached 4.2 V, and maintained at 4.2 V in a constant voltage mode until a current thereof reached a cut-off current of 0.01 C. Next, the coin full cells were discharged with a constant current of 0.1 C until a voltage thereof reached 2.5 V during discharging, thereby completing a formation process.

The lithium batteries resulting after the formation process were charged with a constant current of 0.2 C at a temperature of 25° C. until a voltage thereof reached 4.2 V, and maintained at 4.2 V in a constant voltage mode until a current thereof reached a cut-off current of 0.01 C. Next, the coin full cells were discharged with a constant current of 0.2 C until a voltage thereof reached 2.5 V during discharging, thereby completing a formation process.

The lithium batteries resulting after the standard process were charged with a constant current of 1.0 C at a temperature of 25° C. until a voltage thereof reached 4.0 V, and maintained at 4.0 V in a constant voltage mode until a current thereof reached a cut-off current of 0.05 C. Next, the lithium batteries were discharged with a constant current of 1.0 C until a voltage thereof reached 2.5 V during discharging.

Such a charging and discharging cycle was performed 100 times, and a step of identifying the capacity recovery of each cell was performed at intervals of 100 cycles (charging with a constant current of 1.0 C until a voltage thereof reached 4.0 V, maintaining at 4.0 V in a constant voltage mode until a current thereof reached a cut-off current of 0.01 C, and discharging with a constant current of 0.1 C until a voltage thereof reached 2.5 V during discharging).

In all of the above charge/discharge cycles, a pause of 10 minutes was given after one charge/discharge cycle.

Figure 11:
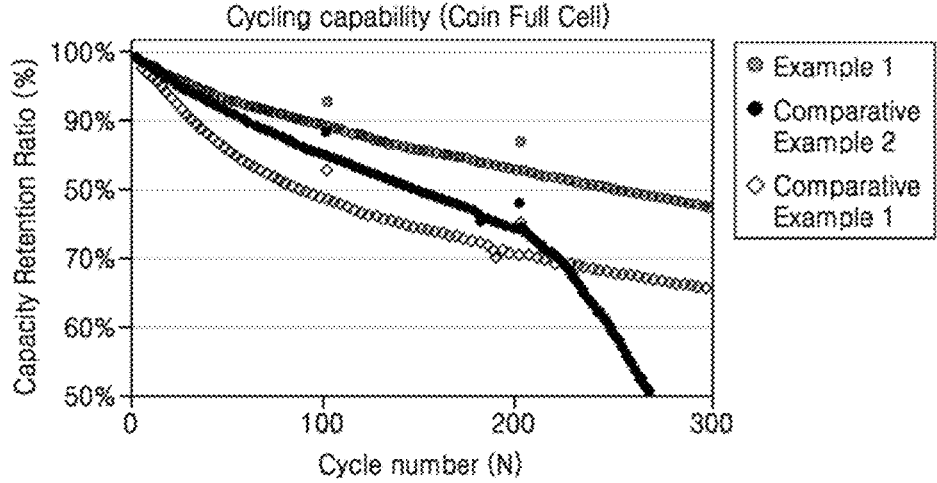
FIG. 11 is a graph illustrating cycle characteristics of lithium secondary batteries manufactured in Example 1 and Comparative Examples 1 and 2.

The results of the charge and discharge experimental evaluation are shown in FIG. 11. The capacity retention ratio at the Nth cycle is defined by Equation 3:

$$\text{Capacity retention ratio [\%]} = [\textit{Nth} \text{ cycle discharge capacity/first cycle discharge capacity}] \times 100 \qquad \text{<Equation 3>}$$

2) The coin full cells of Examples 1 and Comparative Examples 1 and 3 to 7 were charged with a constant current of 0.1 C at a temperature of 25° C. until a voltage thereof reached 0.01 V, and maintained at 4.2 V in a constant voltage mode until a current thereof reached a cut-off current of 0.01 C. Next, the coin full cells were discharged with a constant current of 0.1 C until a voltage thereof reached 2.5 V, thereby completing a formation process.

The lithium batteries resulting after the formation process were charged with a constant current of 0.2 C at a temperature of 25° C. until a voltage thereof reached 4.2 V, and maintained at 4.2 V in a constant voltage mode until a current thereof reached a cut-off current of 0.01 C. Next, the coin full cells were discharged with a constant current of 0.2 C until a voltage thereof reached 2.5 V, thereby completing a formation process.

The lithium batteries resulting after the standard process were charged with a constant current of 1.0 C at a temperature of 25° C. until a voltage thereof reached 4.0 V, and maintained at 4.0 V in a constant voltage mode until a current thereof reached a cut-off current of 0.05 C. Next, the lithium batteries were discharged with a constant current of 1.0 C until a voltage thereof reached 2.5 V during discharging.

Such a charging and discharging cycle was performed 100 times, and a step of identifying the capacity recovery of each cell was performed at intervals of 100 cycles (charging with a constant current of 1.0 C until a voltage thereof reached 4.0 V, maintaining at 4.0 V in a constant voltage mode until a current thereof reached a cut-off current of 0.01 C, and discharging with a constant current of 0.1 C until a voltage thereof reached 2.5 V).

In all of the above charge/discharge cycles, a pause of 10 minutes was given after one charge/discharge cycle.

Figure 12:
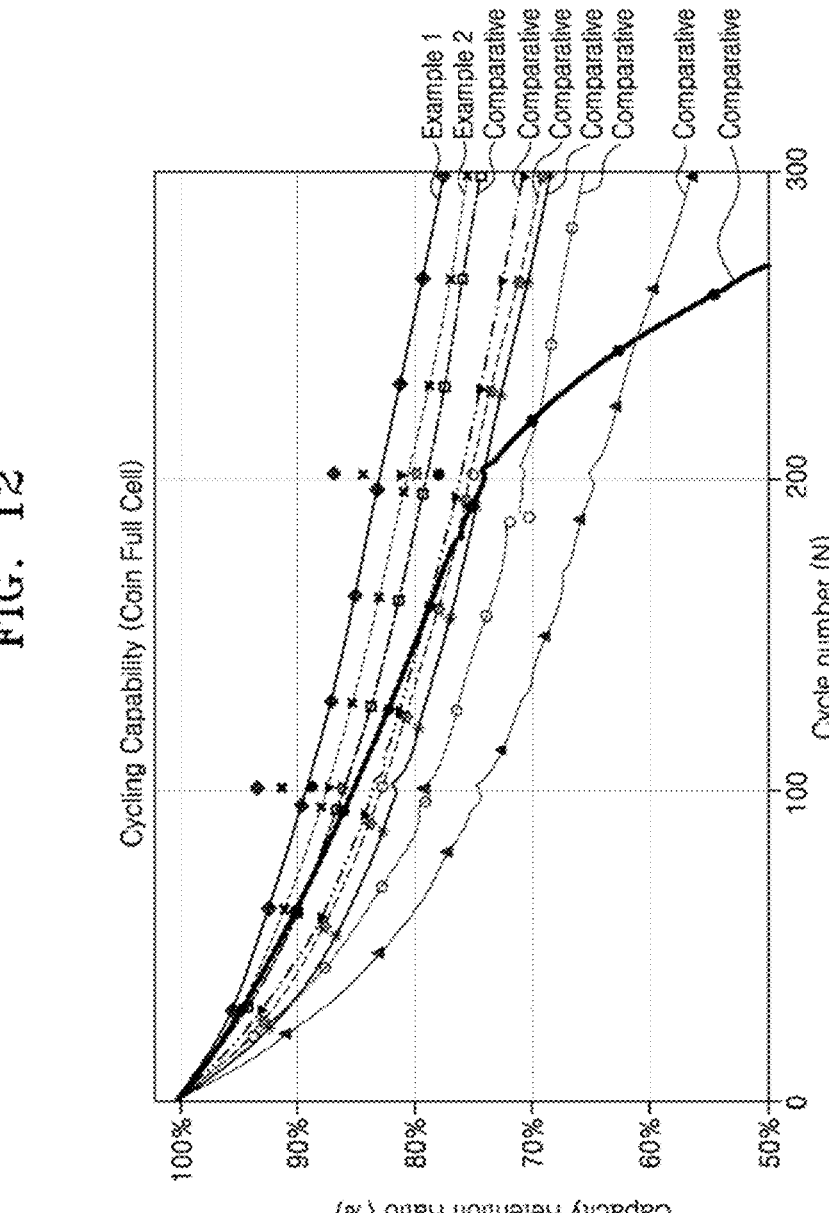
FIG. 12 is a graph illustrating cycle characteristics of lithium secondary batteries manufactured in Examples 1 and 2 and Comparative Examples 1 and 3 to 7.

The evaluation results of the charge and discharge cycling tests are shown in FIG. 12.

Referring to FIGS. 11 and 12, it may be seen that when natural graphite and artificial graphite were used in combination (Examples 1 and 2 and Comparative Example 3), the capacity retention ratio was greater than when only natural graphite was used (Comparative Examples 4 and 5) and when only artificial graphite was used (Comparative Examples 1, 2, 6, and 7), thus indicating an improvement in lifespan. For example, the comparison of Example 1 and Comparative Example 2 illustrated in FIG. 11 showed that the coin full cell of Example 1 exhibited a higher capacity retention ratio and a slower reduction in the cycling capability than those of Comparative Example 2, even if a porous silicon composite nanocluster having a poor lifespan characteristic was used in Example 1.

In addition, it may be seen that the lifespan characteristic was significantly enhanced in the case where a mixture of natural graphite and artificial graphite having relatively large particles (prepared by controlling particle diameters was used (Examples 1 and 2)), compared to the case where a mixture of natural graphite and artificial graphite having normal sized particles, e.g., having particle diameters that were not controlled, was used (Comparative Preparation Example 3).

It may be seen that the lifespan characteristic was further enhanced in the case where particles were classified twice by controlling particle diameters (Example 2), compared to the case where particles were classified once (Example 1).

By way of summation and review, in order to attain a battery having high energy density, there have been attempts to use silicon particles having high discharge capacity as an anode active material. In this case, a considerable side reaction with an electrolyte may occur, leading to deterioration of the anode due to a significant volumetric change in the silicon particles during charging and discharging, ultimately degrading lifespan characteristics.

To suppress the volume expansion of silicon particles, there have been attempts to use silicon particles mixed with carbonaceous materials in the form of a composite. For example, a silicon-carbon composite may include graphite as a carbonaceous material for imparting electrical conductivity to silicon particles and a carbon layer for suppressing the volume expansion of the silicon particles. As the content of silicon particles used is increased, stress may be caused by a volumetric change, and conductivity may degrade. In addition to the degradation of conductivity, adhesion among silicon particles may be lowered due to the volume expansion occurring during charging and discharging.

One or more embodiments may provide a battery having energy density sufficiently high enough to be applied to large electronic devices such as electric vehicles.

According to an embodiment, a lithium secondary battery may employ a composite anode active material including a silicon-carbon composite and a combination of artificial graphite and natural graphite, which satisfy the requirement of specific average particle diameter ranges, thereby improving characteristics of the anode in view of tap density and expansion reduction, and enhancing the discharge rate and cycle life retention capabilities and the efficiency of the lithium secondary battery.

One or more embodiments may provide an anode including a composite anode active material exhibiting superior characteristics in view of tap density and expansion reduction while having a certain level of conductivity.

One or more embodiments may provide a lithium secondary battery employing the anode capable of exhibiting superior characteristics in view of discharge rate and lifespan retention capabilities and efficiency.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composite anode active material, comprising:
a silicon-carbon composite;
a first graphite having an average particle diameter $D_{50}$ of about 19 μm to about 22 um;
a second graphite having an average particle diameter $D_{50}$ of 33.8 μm to about 44 μm; and
flake graphite, wherein:

the silicon-carbon composite has an average particle diameter $D_{50}$ of about 8 μm to about 12 μm, an average particle diameter $D_{50}$ of the flake graphite is smaller than or equal to that of the silicon-carbon composite, the average particle diameter $D_{50}$ of the silicon-carbon composite is smaller than or equal to that of the first graphite, the average particle diameter $D_{50}$ of the first graphite is smaller than or equal to that of the second graphite, the first graphite is artificial graphite, and the second graphite is natural graphite, the flake graphite is included in an amount of about 5% by weight or less, based on a total weight of the composite anode active material, the first graphite has a pellet density in a range of about 1.69 g/cc to about 1.73 g/cc, the second graphite has a pellet density in a range of about 2.0 g/cc to about 2.13 g/cc, and the pellet density is the density of the pellet which is obtained by adding 1 g of the first graphite or the second graphite to a circular mold having a diameter of 1 centimeter (cm), and then applying a pressure of 1,000 kgf/cm².

2. The composite anode active material as claimed in claim 1, wherein the silicon-carbon composite has a structure in which silicon particles are coated with a carbon compound.

3. The composite anode active material as claimed in claim 1, wherein the silicon-carbon composite is a porous silicon composite cluster including a porous core including a porous silicon composite secondary particle and a shell including a second graphene on the core.

4. The composite anode active material as claimed in claim 3, wherein:

the porous silicon composite secondary particle includes an aggregate of two or more silicon composite primary particles, and the silicon composite primary particles are porous silicon composite clusters each including silicon; $SiO_x$, in which 0<x<2, on the silicon; and a first graphene on the silicon oxide.

5. The composite anode active material as claimed in claim 1, wherein the silicon-carbon composite includes:

a porous silicon composite cluster including a porous silicon composite secondary particle and second carbon flakes on at least one surface of the porous silicon composite secondary particle; and a carbon coating film including amorphous carbon on the porous silicon composite cluster.

6. The composite anode active material as claimed in claim 5, wherein:

the porous silicon composite secondary particle includes an aggregate of two or more silicon composite primary particles, and the silicon composite primary particles are porous silicon composite cluster structures, each including silicon; $SiO_{x'}$, in which 0<x'<2, on at least one surface of the silicon; and first carbon flakes on at least one surface of the silicon oxide.

7. The composite anode active material as claimed in claim 1, wherein:

the first graphite has a crystal interplanar spacing $d_{002}$ in a range of 3.359 Å to 3.360 Å, and the second graphite has a crystal interplanar spacing $d_{002}$ in a range of 3.356 Å to 3.357 Å.

8. The composite anode active material as claimed in claim 1, wherein the composite anode active material has a zinc blende structure and satisfying the following Formula 1:

$$0.225 \leq r_C/r_A \leq 0.414 \qquad \text{<Formula 1>}$$

wherein, in Formula 1, $r_C$ is an average particle diameter $D_{50}$ of the silicon-carbon composite, and $r_A$ is an average particle diameter $D_{50}$ of each of the first graphite and the second graphite.

9. An anode comprising the composite anode active material as claimed in claim 1.

10. The anode as claimed in claim 9, wherein the anode has an area disorder of 0.6 or less, as evaluated by a distribution diagram based on Delaunay triangulation.

11. A lithium secondary battery, comprising:

a cathode; the anode as claimed in claim 9; and an electrolyte.

\* \* \* \* \*